(12) United States Patent
Park

(10) Patent No.: US 6,364,430 B1
(45) Date of Patent: Apr. 2, 2002

(54) SOLENOID VALVE FOR ANTI-LOCK BRAKE SYSTEM

(75) Inventor: Kyung-Ill Park, Pyungtak (KR)

(73) Assignee: Mando Machinery Corporation, Gunpo (KR)

( * ) Notice: Subject to any disclaimer, the term of this patent is extended or adjusted under 35 U.S.C. 154(b) by 0 days.

(21) Appl. No.: 09/435,740

(22) Filed: Nov. 8, 1999

(30) Foreign Application Priority Data

Nov. 13, 1998 (KR) ............................................. 98-22110
Feb. 6, 1999 (KR) ............................................. 99-4137

(51) Int. Cl.$^7$ ................................................ B60T 8/36
(52) U.S. Cl. ................ 303/119.2; 137/599; 251/129.02
(58) Field of Search ........................... 303/119.2, 119.3; 137/599; 251/129.02; 91/443

(56) References Cited

U.S. PATENT DOCUMENTS

| | | | |
|---|---|---|---|
| 5,647,644 A | | 7/1997 | Volz et al. |
| 5,704,587 A | * | 1/1998 | Kuromitsu et al. ...... 303/119.2 |
| 5,791,628 A | * | 8/1998 | Wolff et al. ............... 303/119.2 |
| 5,865,213 A | * | 2/1999 | Scheffel et al. .......... 303/119.2 |
| 5,967,627 A | * | 10/1999 | Hosoya et al. ........... 303/119.2 |
| 5,971,501 A | * | 10/1999 | Hosoya .................... 303/119.2 |

* cited by examiner

*Primary Examiner*—Matthew C. Graham
(74) *Attorney, Agent, or Firm*—Ladas & Parry

(57) ABSTRACT

An anti-lock brake system includes a wheel cylinder, a master cylinder for supplying brake pressure to the wheel cylinder, a modulator having a fluid intake passage communicating with the master cylinder and a fluid exhaust passage communicating with the wheel cylinder, and a solenoid valve mounted within the modulator to control hydraulic pressure supplied from the master cylinder to the wheel cylinder. The solenoid valve includes a coil assembly disposed within a yoke to create an electromagnetic field using electric current applied, an armature disposed through a central axis of the yoke, the armature being slidable along the central axis by the electromagnetic field, a plunger coupled to the armature, a magnetic core provided with an invariable orifice opened and closed by the plunger to selectively communicate the fluid intake passage with the fluid exhaust passage, one end of the magnetic core being forcedly fitted in a bore of the modulator block, and a piston slidably disposed under the magnetic core to contact or move away from the invariable orifice formed in the magnetic core according to a brake mode, the piston being provided with a variable orifice which comes to communicate with the invariable orifice when the piston contacts the invariable orifice, a diameter of the variable orifice being smaller than that of the invariable orifice.

16 Claims, 15 Drawing Sheets

SOLENOID VALVE FOR ANTI-LOCK BRAKE SYSTEM

BACKGROUND OF THE INVENTION

1) Field of the Invention

The present invention relates to an anti-lock brake system and, more particularly, to a solenoid valve for an anti-lock brake system that can enhance a braking performance by variably controlling an amount of fluid to be supplied during a slip control.

2) Description of Related Art

Generally, a brake system comprises a wheel cylinder mounted on an automotive wheel to generate brake force using hydraulic pressure, a booster/mater cylinder assembly for forming hydraulic pressure and supplying the same to the wheel cylinder, and a modulator for controlling the hydraulic pressure to be supplied according to a running condition of a vehicle in accordance with signals transmitted from an electronic control unit.

The modulator is equipped with a normal-open and normal-close solenoid valves for controlling the supply of brake pressure. The normal-open solenoid valve is designed to, in a normal brake mode, maintain an opened state to supply hydraulic pressure to the master cylinder without pressure reduction, and, in a slip control mode, control an amount of the oil to control the brake pressure.

The normal-open solenoid valve controls the amount of the oil by a simple On/Off operation of a plunger. Accordingly, the flow rate of the oil which can pass through the valve at the slip control mode is the same as at the normal brake mode.

Therefore, in such a conventional normal-open solenoid valve, the hydraulic pressure to be supplied cannot be precisely controlled, making it difficult to accurately perform a slip control. Furthermore, water hammering phenomenon, which occurs by pulsation of fluid when the plunger moves to open and close positions, results in a noise and deteriorates the durability of parts.

To solve the above described problems, a normal-open solenoid valve which is designed to reduce an amount of the fluid to be supplied to the wheel cylinder in proportion to a slip rate, while alleviating the pulsation of the fluid during a slip control, has been developed.

An example of such a normal-open solenoid valve is disclosed in U.S. Pat. No. 5,647,644.

As shown in FIG. 1, the normal-open solenoid valve disclosed in the patent comprises a valve seat 23, a magnetic core 21, a plunger 22, and a piston 24, all of which are installed in a valve housing 20. The valve seat 23 is forcedly fitted in a lower portion of the valve housing 20 and provided with a longitudinal hole. The plunger 22 is mounted through the magnetic core 21 such that a lower end thereof is disposed in the vicinity of a top of the valve seat 23. The piston 24 is disposed around the valve seat 23 and biased against the magnetic core 21 by a spring 25.

The normal-open solenoid valve is provided with two orifices, one of which is an invariable orifice 30 formed on an upper end of the valve seat 23 and the other is a variable orifice 40 that is defined by a slot 26 formed on a top of the piston 24 when the piston 24 contacts the magnetic core 21 during a slip control.

In addition, a hydraulic channel branch 31 is defined between one side wall of the valve seat 23 and the valve housing 20 so that hydraulic pressure supplied through an inlet 27 can be applied to the piston 24 through the hydraulic channel branch 31, thereby displacing the piston 24 upward while overcoming the biasing force of the spring 25. A stepped portion 23a is formed on another lower side of the valve seat 23 so as to forcedly fit the valve seat 23 into the valve housing 20.

In a normal brake mode, the plunger 22 is urged upward while the piston 24 is biased downward by the spring 25. Therefore, fluid is supplied through the inlet 27, then directed to an outlet 28 through the invariable orifice 30.

In a slip control mode, the plunger 22 is displaced downward to close the invariable orifice 30. As a result, the fluid supplied through the inlet 27 is applied to the piston 24 through the hydraulic channel branch 31 so that the top of the piston 24 contacts the magnetic core 21 by being moved upward while overcoming elastic force of the spring 25. After this, when the plunger 22 is moved upward, the hydraulic pressure generated by the master cylinder is directed to the wheel cylinder through the variable orifice 40 formed by the slot 26 of the piston 24 contacting the magnetic core 21.

When brake force is released, fluid within the wheel cylinder is returned to the master cylinder through the return passage 29 formed through the valve housing 20 to communicate the inlet 27 with the outlet 28. After this, the plunger 22 is moved upward so that the solenoid valve is returned to its open state.

However, in the above-described normal-open solenoid valve, since the lower portion of the valve seat is designed having the stepped portion and the channel branch defining portion, and the channel branch defining portion is precisely formed, it is difficult to manufacture the valve seat.

In addition, the special valve housing for receiving the magnetic core, the valve seat, the piston and the fluid passages is required, increasing the entire size of the solenoid valve.

SUMMARY OF THE INVENTION

Therefore, the present invention has been made in an effort to solve the above described problems.

It is an objective of the present invention to provide a solenoid valve for an anti-lock brake system, which can vary an amount of fluid to be supplied during an slip control.

It is another objective of the present invention to provide a solenoid valve, which is simple in the structure and easy to be manufactured.

To achieve the above objectives, the present invention provides a solenoid valve comprising a coil assembly disposed within a yoke to create an electromagnetic field using electric current applied, an armature disposed through a central axis of the yoke, the armature being slidable along the central axis by the electromagnetic field, a plunger coupled to the armature, a magnetic core provided with an invariable orifice opened and closed by the plunger to selectively communicate the fluid intake passage with the fluid exhaust passage, one end of the magnetic core being forcedly fitted in a bore of the modulator block, and a piston slidably disposed under the magnetic core to contact or move away from the invariable orifice formed in the magnetic core according to a brake mode, the piston being provided with a variable orifice which comes to communicate with the invariable orifice when the piston contacts the invariable orifice, a diameter of the variable orifice being smaller than that of the invariable orifice. The piston contacts the invariable orifice in a slip control mode, thus only fluid within the variable orifice is supplied to the wheel cylinder after passing through the invariable orifice and the fluid exhaust passage.

According to an embodiment of the present invention, the magnetic core is provided with a valve seat in which the invariable orifice is formed.

The piston is further provided with a piston passage coaxially extending from the variable orifice to communicate the fluid intake passage with the variable orifice and a plurality of branch passages branched off from the piston passage at a predetermined angle such that fluid supplied through the fluid intake passage can be directed to the invariable orifice in a normal brake mode.

Preferably, the predetermined angle is in a range of about 90–150 degrees, and at least one O-ring is provided around an outer circumference of the piston.

A spring is disposed between the magnetic core and the piston, the spring biasing the piston in a direction away from the invariable orifice of the magnetic core in a normal brake mode.

According to another embodiment of the present invention, the magnetic core is provided with a fluid outlet hole for directing fluid supplied through the invariable orifice to the fluid exhaust passage. A lip-seal is provided between an outer circumference of the magnetic core and the bore of the modulator block.

The solenoid valve may further comprise a fluid guide member fixedly fitted in the bore under the piston, the fluid guide member functioning as a means of guiding fluid supplied from the master cylinder to the piston as well as functioning as a stopper for restricting the downward movement of the piston.

A guide tube is formed in the fluid guide member to define a guide passage communicating with the fluid intake passage, a portion of the guide tube extending into the piston.

The guide tube is provided at a top with a first communicating hole for communicating the guide passage with the variable orifice, at a side with a plurality of second communicating holes for applying fluid to a lower end of the piston in a slip control mode.

A lip-seal is formed between an outer circumference of the fluid guide member and the bore of the modulator block.

According to still another embodiment of the present invention, the variable orifice is defined by a plurality of fluid grooves formed on a top of the piston, each width of the grooves is smaller than the diameter of the invariable orifice, and the piston is provided with a piston passage formed through a central axis and communicating the fluid intake passage with the variable orifice, and a plurality of branch passages branched off from the piston passage at a predetermined angle such that fluid supplied through the fluid intake passage can be directed to the invariable orifice in a normal brake mode.

The predetermined angle is in a range of about 90–150 degrees.

According to still yet another embodiment of the present invention, the magnetic core is provided with a bypass passage communicating with the fluid exhaust passage, the piston is provided with a return passage for communicating the bypass passage with the fluid intake passage, and a check valve is installed within the return passage.

Preferably, a filter is provided for holding back solid substances in fluid to be supplied.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 14b is a sectional view of a piston depicted in FIG. 14a;

FIG. 15b is a sectional view of a piston depicted in FIG. 15a;

DETAILED DESCRIPTION OF PREFERRED EMBODIMENTS

A preferred embodiment of the present invention will now be described in detail with reference to the accompanying drawings.

In general, an anti-lock brake system comprises wheel cylinders provided at the vehicle's wheels for generating the brake force by the hydraulic pressure, pressure booster and master cylinder for producing the hydraulic pressure and transmitting to the wheel cylinders, and modulator and electronic control unit for controlling the hydraulic pressure.

In the modulator are mounted normal-open solenoid valves for controlling the flow of the oil transmitted to the wheel cylinders from the master cylinder.

Figures 1, 1A:
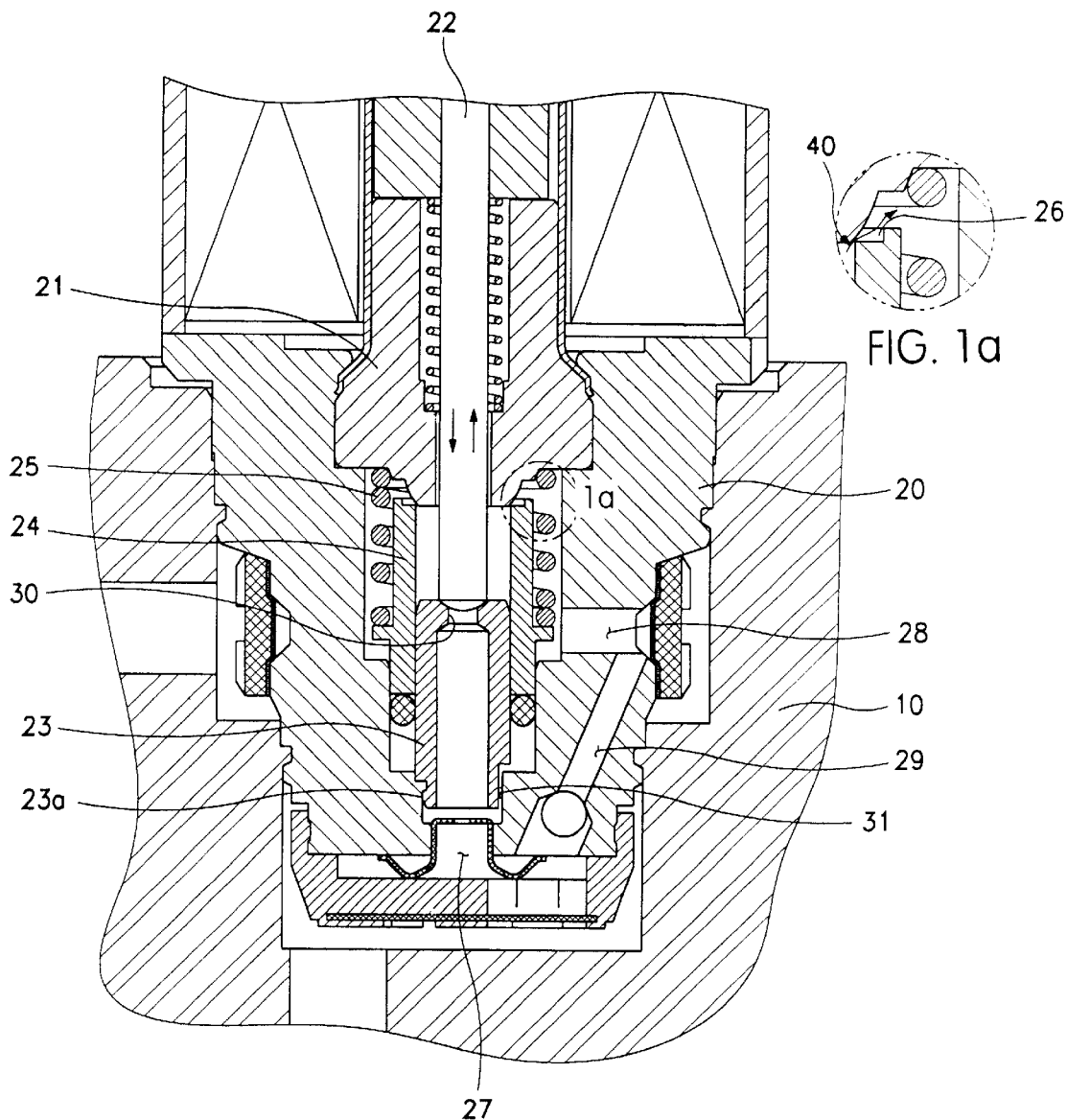
FIG. 1 is a sectional view illustrating a conventional solenoid valve for an anti-lock brake system.
Figures 2, 2A:
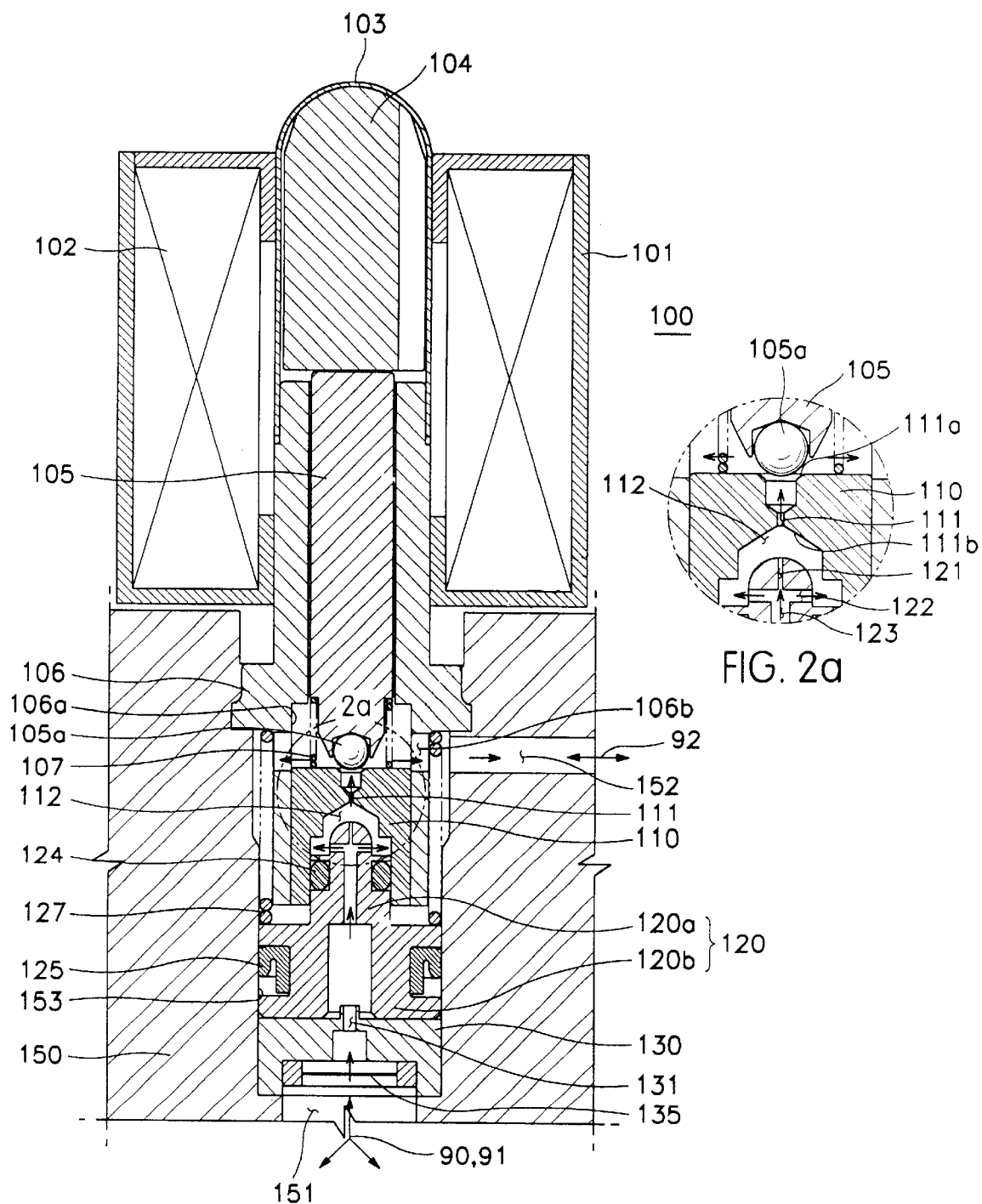
FIG. 2 is a sectional view of a solenoid valve for an anti-lock brake system according to a first embodiment of the present invention, showing an invariable orifice completely opened in a normal brake mode.

FIG. 2 shows a sectional view of a normal-open solenoid valve according to a first embodiment of the present invention.

A normal-open solenoid valve according to this embodiment is denoted by reference number 100. The normal-open solenoid valve 100 comprises a coil assembly 102 disposed within a yoke 101 to create an electromagnetic field when electric current is applied thereto, a cylindrical sleeve 103 mounted through an axial hole of the yoke 101, an armature 104 which is disposed within the sleeve 103 to be able to move up and down by the interaction with the electromagnetic field created by the coil assembly 102, a plunger 105 coupled to the armature 104, and a magnetic core 106 which is forcedly fitted in a bore 153 of the modulator block 150.

A valve seat 110 is forcedly fitted into a valve seat receiving space 106a defined by the lower portion of the magnetic core 106, the valve seat 110 being provided at its top with an invariable orifice 111 having a predetermined diameter. A piston 120 provided with a variable orifice 121 is disposed within a fluid pressurizing chamber 112 defined by the valve seat 110 such that the piston 120 is slidable to contact or be moved away from the invariable orifice 111 of the valve seat 110.

The plunger 105 is disposed through a central hole of the magnetic core 106, extending to the invariable orifice 111 of the valve seat 110. Provided on a bottom of a lower end of the plunger 105 is a ball 105a for closing and opening a top opening of the invariable orifice 111.

First and second seat portions 111a and 111b for the respective plunger 105 and the piston 120 are respectively formed on the top and bottom openings of the invariable orifice 111.

Disposed between the valve seat 110 and the plunger 105 is a first spring 107 for biasing the plunger 105 upward so as to maintain the invariable orifice 111 in an opened state during a normal brake operation, and disposed between the piston 120 and the magnetic core 106 is a second spring 127 for biasing the piston 120 downward to maintain the piston 120 in a position away from the invariable orifice 111 during the normal brake operation.

In addition, the modulator block 150 is provided with a fluid intake passage 151 connected to both a master cylinder 90 and a hydraulic pump 91, and a fluid exhaust passage 152 connected to a wheel cylinder 92. Therefore, braking operation is realized by directing fluid from the master cylinder 90 or the hydraulic pump 91 to the wheel cylinder 92 via the fluid intake passage 151, the invariable orifice 111 and the fluid exhaust passage 152. This will be described more in detail hereinbelow.

The magnetic core 106 is provided at its lower portion with a fluid outlet hole 106b through which fluid supplied through the invariable orifice 111 is directed to the fluid exhaust passage 152.

An upper portion 120a of the piston 120 is slidably disposed within the fluid pressurizing chamber 112 defined by the valve seat 110 and provided at its outer circumference with an O-ring 124 for preventing fluid from leaking through a gap between the piston 120 and the valve seat 110.

A lower portion 120b of the piston 120 is slidably disposed within the bore 153 of the modulator block 150 and provided at its outer circumference with a lip-seal 125 for preventing fluid from leaking through a gap between the piston 120 and the bore 153.

A fluid guide member 130 is fixedly fitted in the bore 153 under the piston 120. The fluid guide member 130 functions as a means of guiding fluid supplied from the master cylinder 90 or the hydraulic pump 91 to the piston 120. The fluid guide member 130 further functions as a stopper for restricting the downward movement of the piston 120. The fluid guide member 130 is provided with a guide passage 131 communicating with the fluid intake passage 151.

The piston 120 is provided with a piston passage 123 formed through a central axis and communicating the fluid intake passage 151 with the invariable orifice 111, a plurality of branch passages 122 perpendicularly branched off from the piston passage 123 to communicate the piston passage 123 with the fluid pressurizing chamber 112, and a variable orifice 121 coaxially extending from the piston passage 123 to communicate the piston passage 123 with the fluid pressurizing chamber 112. The diameter of the variable orifice 121 is smaller than that of the invariable orifice 111.

A filter 135 is provided on a bottom of the fluid guide member 130 to hold back solid substances in fluid.

The operation of the above-described normal-open solenoid valve will be described more in detail with reference to FIGS. 2 to 5.

In a normal brake mode, when a driver depresses a brake pedal, brake pressure formed by the master cylinder 90 is supplied to the wheel cylinder 92 through the normal-open solenoid valve 100. That is, since the normal-open solenoid valve 100 is maintained in an opened state, as shown in FIG. 2, the brake pressure passes through the fluid intake passage 151, the guide passage 131 of the fluid guide member 130, the piston passage, branch passages, and variable orifice 123, 122 and 121 of the piston 120, the invariable orifice 111, the fluid outlet hole 106b, and the fluid exhaust passage 152 in this order, then is directed to the wheel cylinder 92 to realize the normal brake operation. At this point, since the brake pressure is effectively supplied to the invariable orifice 111 through the guide passage 131, the branch passages 122 and the variable orifice 121, the brake response can be quickly realized. When the driver releases the brake pedal, the brake pressure within the wheel cylinder 92 is returned to the master cylinder 90 through the normal-open solenoid valve 100 to reduce or release the brake force.

In addition, when a slip occurs on a wheel, the normal-open solenoid valve 100 is operated to realize a slip control mode in which the brake pressure is reduced, maintained and increased. This will be described more in detail hereinafter.

Figures 3, 3A:
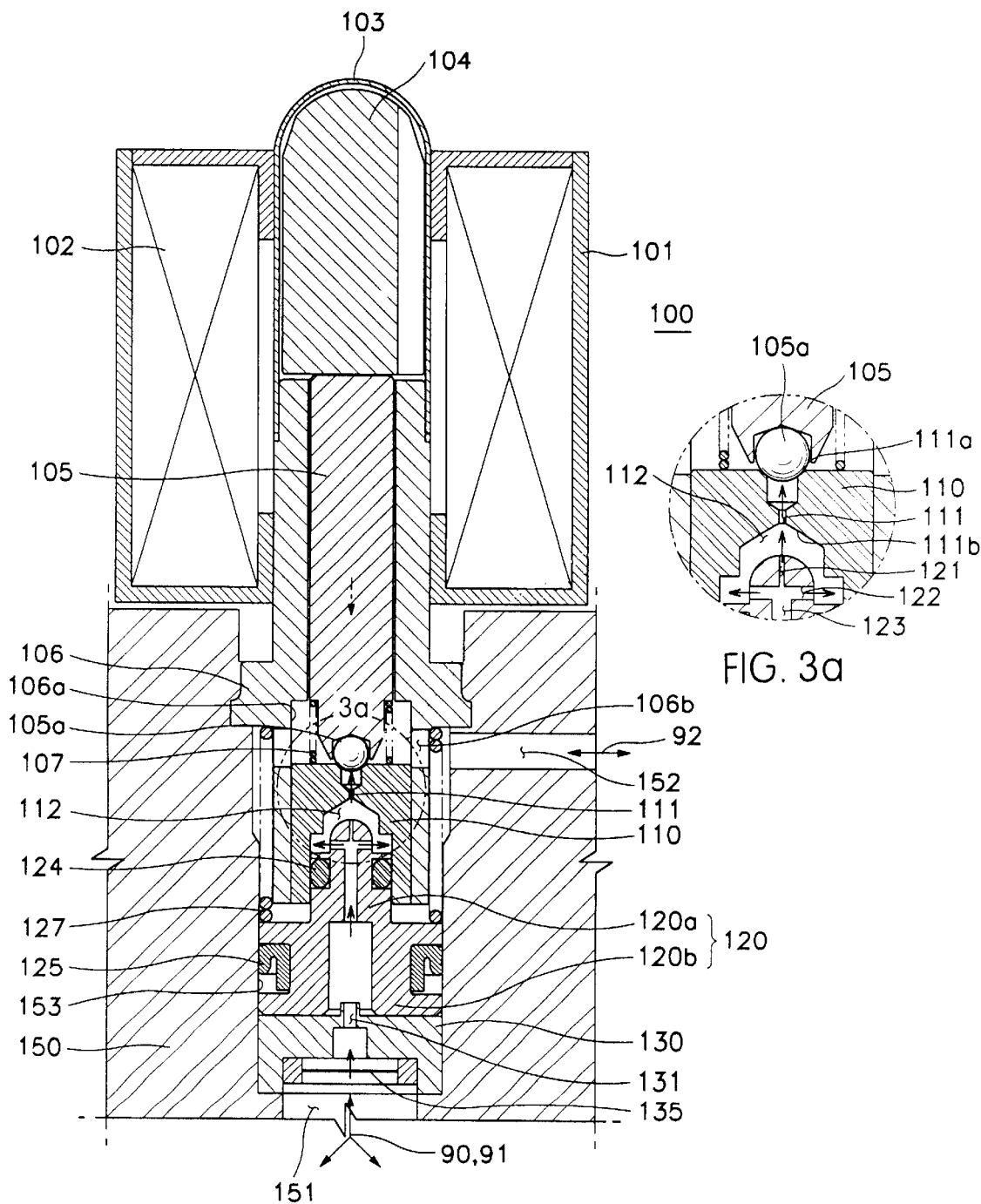
FIG. 3 is a sectional view of a solenoid valve for an anti-lock brake system according to a first embodiment of the present invention, showing an invariable orifice completely closed in a slip control mode.

In the pressure reducing or maintaining operation, the normal-open solenoid valve 100 is closed to reduce or maintain the brake pressure within the wheel cylinder 92. That is, when electric current is applied to the solenoid valve 100, as shown in FIG. 3, the plunger 105 is displaced downward while overcoming the biasing force of the first spring 107 such that the ball 105a is seated on the first seat portion 111a, thereby completely closing the invariable orifice 111. As a result, the brake pressure is not supplied to the wheel cylinder 92 any more.

Figures 4, 4A:
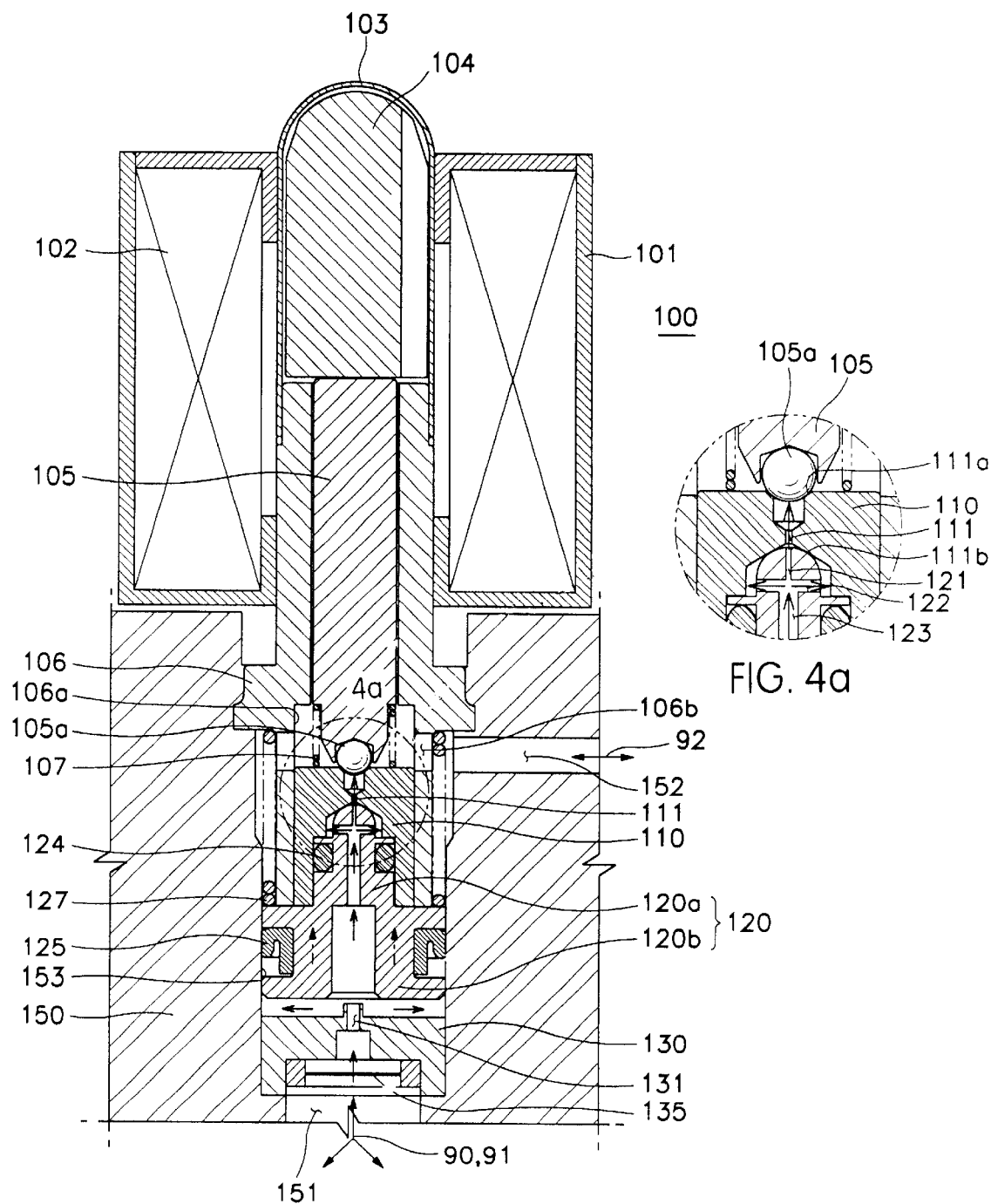
FIG. 4 is a sectional view of a solenoid valve for an anti-lock brake system according to a first embodiment of the present invention, showing a piston contacting an invariable orifice in a slip control mode.

At this point, since the brake pressure is continuously supplied to the solenoid valve 100 through the fluid intake passage 151, pressure within the solenoid valve 100 is steeply increased. The increased brake pressure acts between the lower end of the piston 120 and the upper end of the fluid guide member 130, and, when pressure difference higher than a predetermined level is generated between the fluid intake passage 151 and the fluid exhaust passage 152, moves the piston 120 upward while overcoming the biasing force of the second spring 127 so that the piston 120 contacts the second seat portion 111b as shown in FIG. 4. Accordingly, in a state where the top opening of the invariable orifice 111 is closed by the ball 105a of the plunger 105, the bottom opening of the invariable orifice 111 comes to communicate with the variable orifice 121 of the piston 120.

Figures 5, 5A:
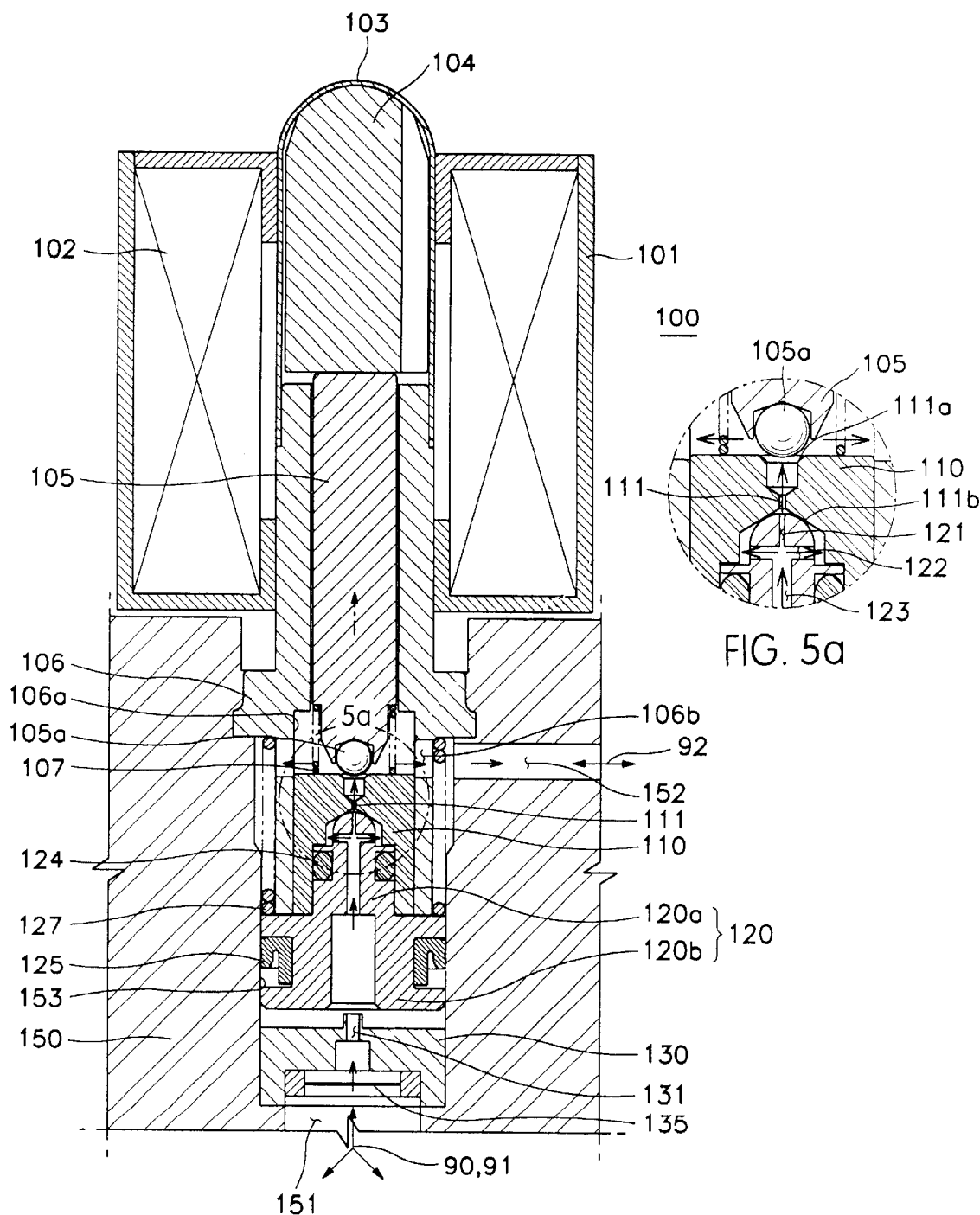
FIG. 5 is a sectional view of a solenoid valve for an anti-lock brake system according to a first embodiment of the present invention, showing an invariable orifice completely opened in a slip control mode.

In this state, when electric current applied to the solenoid valve 100 is disconnected for the pressure increasing operation, as shown in FIG. 5, the plunger 105 is moved upward by the biasing force of the first spring 107, thereby opening the top opening of the invariable orifice 111. As the top opening of the invariable orifice 111 is opened, the fluid within the variable orifice 121 is supplied to the wheel cylinder 92 through the invariable orifice 111 and the fluid outlet hole 106b, thereby increasing the brake pressure. At this point, although pressure difference occurs between the top and bottom openings of the invariable orifice 111, since the diameter of the variable orifice 121 is relatively small, the pressure can be stably supplied.

When the pressure difference between the top and bottom openings of the invariable orifice 111 is extinguished as the hydraulic pressure is supplied, the piston 120 is displaced downward by the biasing force of the second spring 127 to move away from the second seat portion 111b of the valve seat 110. As a result, the brake pressure is supplied to the invariable orifice 111 through both the variable orifice 121 and the branch passages 122.

As described, when the brake pressure is increased in the slip mode, since the brake pressure is stably supplied through the variable orifice 121 and the invariable orifice 111, pressure impact and noise occurring between the top and bottom openings of the invariable orifice 111 can be greatly reduced, and the brake operation can be effectively realized.

Figures 6, 6A:
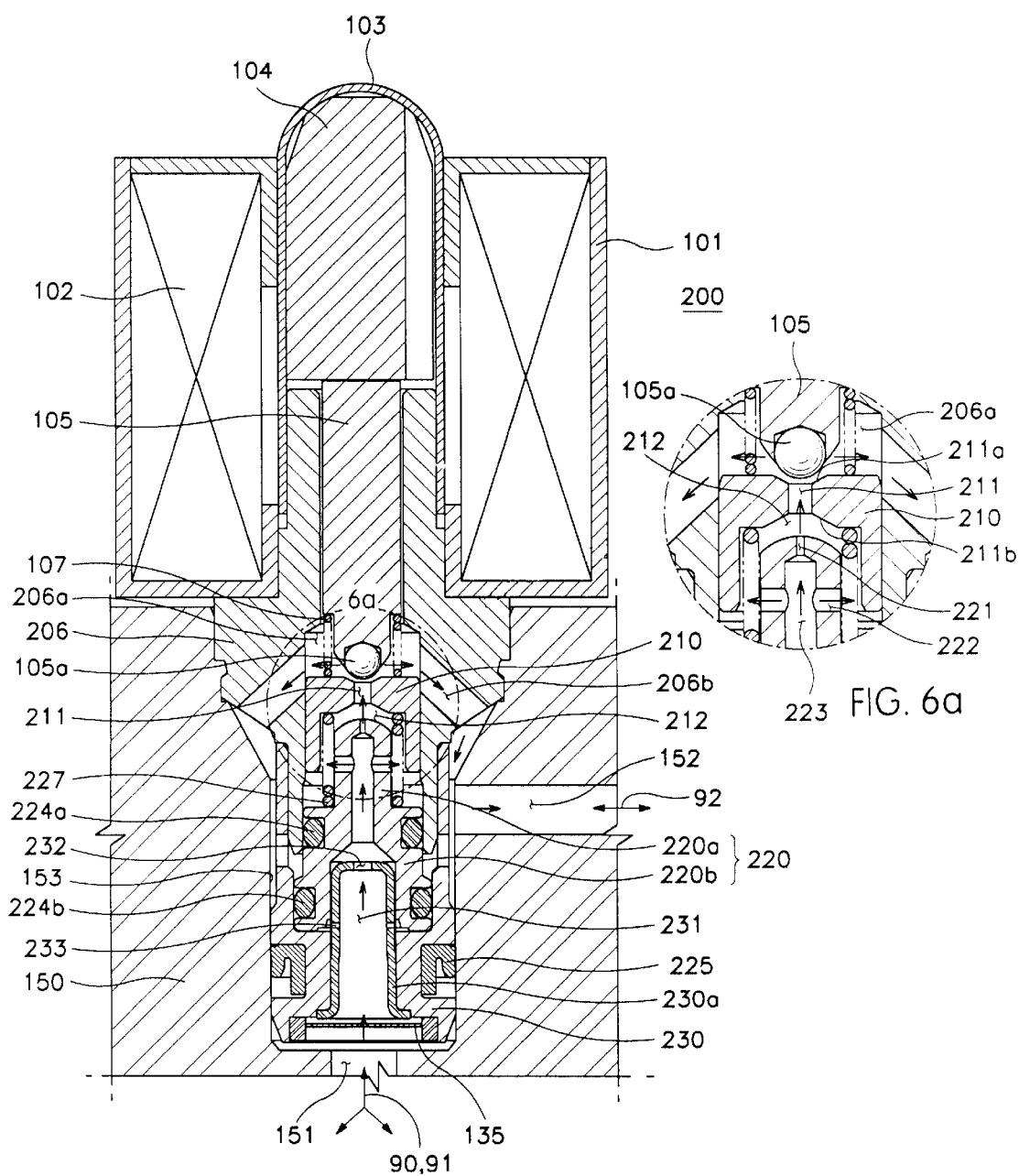
FIG. 6 is a sectional view of a solenoid valve for an anti-lock brake system according to a second embodiment of the present invention, showing an invariable orifice completely opened in a normal brake mode.

FIG. 6 shows a sectional view of a normal-open solenoid valve according to a second embodiment of the present invention. A description of parts which are identical to those in the first embodiment and have the same reference numbers will be omitted herein.

As shown in FIG. 6, a normal-open solenoid valve 200 of a second embodiment comprises a magnetic core 206 which is forcedly fitted in a bore 153 of the modulator block 150. And, a valve seat 210 is forcedly fitted into a valve seat receiving space 206a defined by the lower portion of the magnetic core 206, the valve seat 210 being provided at its top with an invariable orifice 211 having a predetermined diameter. A piston 220 provided with a variable orifice 221 is disposed within a fluid pressurizing chamber 212 defined by the valve seat 210 such that the piston 220 is slidable to contact or be moved away from the invariable orifice 211 of the valve seat 210. The plunger 105 is disposed through a central hole of the magnetic core 206, extending to the invariable orifice 211 of the valve seat 210. Provided on a bottom of a lower end of the plunger 105 is a ball 105a for closing and opening a top opening of the invariable orifice 211. First and second seat portions 211a and 211b for the respective ball 105a of plunger 105 and piston 220 are respectively formed on the top and bottom openings of the invariable orifice 211.

Disposed between the valve seat 210 and the plunger 105 is a first spring 107 for biasing the plunger 105 upward so as to maintain the invariable orifice 211 in an opened state during a normal brake operation, and disposed between the piston 220 and the valve seat 210 is a second spring 227 for biasing the piston 220 downward to maintain the piston 220 in a position away from the invariable orifice 211 during the normal brake operation.

The magnetic core 206 is provided at its lower portion with a fluid outlet hole 206b through which fluid supplied through the invariable orifice 211 is directed to the fluid exhaust passage 152.

An upper portion 220a of the piston 220 is slidably disposed within the fluid pressurizing chamber 212.

A fluid guide member 230 is fixedly fitted in the bore 153 under the piston 220. The fluid guide member 230 functions as a means of guiding fluid supplied from the master cylinder 90 or the hydraulic pump 91 to the piston 220. The fluid guide member 230 further functions as a stopper for restricting the downward movement of the piston 220.

A guide tube 230a is inserted in a central hole of the fluid guide member 230, defining a guide passage 231 communicating with the fluid intake passage 151. The guide tube 230a extends inside the piston 220, being provided at its top with a first communicating hole 232 through which the fluid within the guide passage 231 is supplied to the piston 220 and at its side contacting a lower end of the piston 220 with a plurality of second communicating holes 233.

The piston 220 is provided with a piston passage 223 formed through a central axis and communicating the guide passage 231 defined by the guide tube 230a with the invariable orifice 211, a plurality of branch passages 222 perpendicularly branched off from the piston passage 223 to communicate the piston passage 223 with the fluid pressurizing chamber 212, and a variable orifice 221 coaxially extending from the piston passage 223 to communicate the piston passage 223 with the fluid pressurizing chamber 212. The diameter of the variable orifice 221 is smaller than that of the invariable orifice 211.

First and second O-rings 224a and 224b are provided around a lower portion 220b of the piston 220, and a lip-seal 225 is provided around the fluid guide member 230 to prevent fluid from leaking through a gap between the fluid guide member 230 and the bore 153.

A filter 135 is provided on a bottom of the fluid guide member 230 to hold back solid substances in fluid.

The operation of the above-described normal-open solenoid valve will be described more in detail with reference to FIGS. 6 to 9.

In a normal brake mode, when a driver depresses a brake pedal, brake pressure formed by the master cylinder 90 is supplied to the wheel cylinder 92 through the normal-open solenoid valve 200. That is, since the normal-open solenoid valve 200 is maintained in an opened state, as shown in FIG. 6, the brake pressure passes through the fluid intake passage 151, the guide passage 231 defined by the guide tube 230a, the piston passage, branch passages, and variable orifice 223, 222 and 221 of the piston 220, the invariable orifice 211, the fluid outlet hole 206b, and the fluid exhaust passage 152 in this order, then is directed to the wheel cylinder 92 to realize the normal brake operation. At this point, since the brake pressure is effectively supplied to the invariable orifice 211 through the guide passage 231, the branch passages 222 and the variable orifice 221, the brake response can be quickly realized. When the driver releases the brake pedal, the brake pressure within the wheel cylinder 92 is returned to the master cylinder 90 through the normal-open solenoid valve 200 to reduce or release the brake force.

Figure 7:
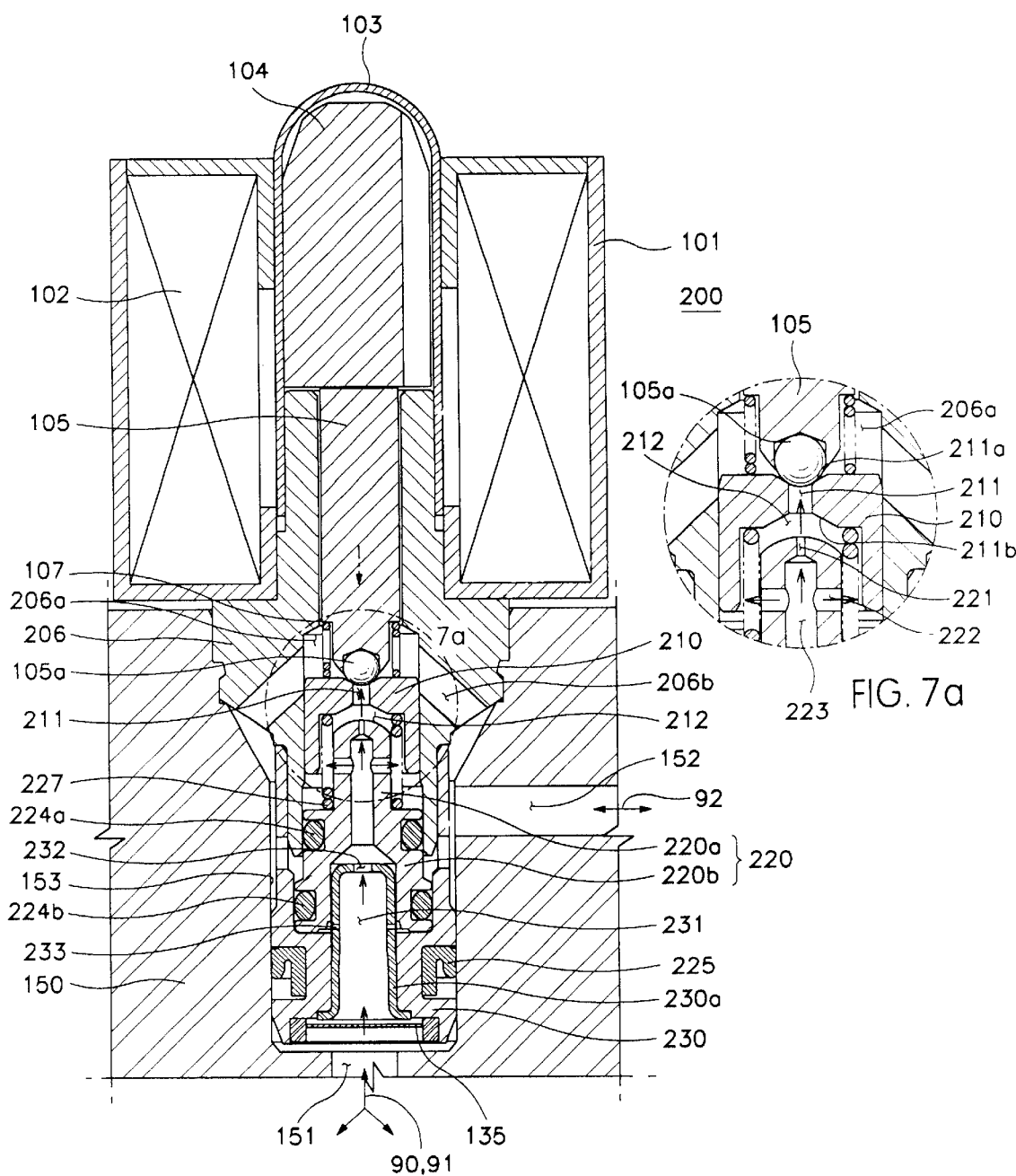
FIG. 7 is a sectional view of a solenoid valve for an anti-lock brake system according to a second embodiment of the present invention, showing an invariable orifice completely closed in a slip control mode.

In addition, in the pressure reducing or maintaining operation when a slip occurs on a wheel, electric current is applied to the solenoid valve 200, as shown in FIG. 7, and then, the plunger 105 is displaced downward while overcoming the biasing force of the first spring 107 such that the ball 105a is seated on the first seat portion 211a, thereby completely closing the invariable orifice 211. As a result, the brake pressure is not supplied to the wheel cylinder 92 any more.

Figures 8, 8A:
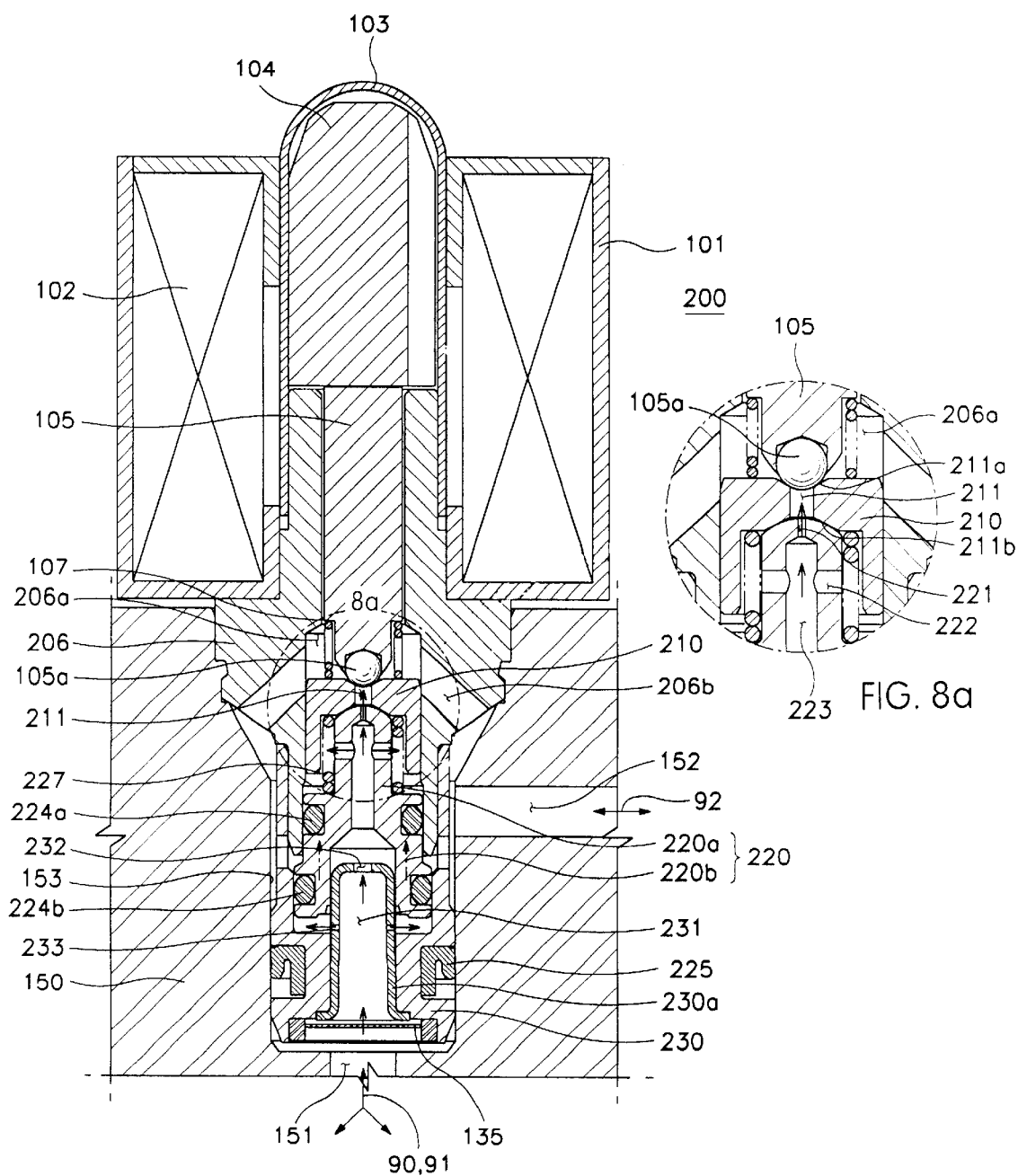
FIG. 8 is a sectional view of a solenoid valve for an anti-lock brake system according to a second embodiment of the present invention, showing a piston contacting an invariable orifice in a slip control mode.

At this point, since the brake pressure is continuously supplied to the solenoid valve 200 through the fluid intake passage 151, pressure within the solenoid valve 200 is steeply increased. The increased brake pressure acts between the lower end of the piston 220 and the upper end of the fluid guide member 230 through the second communicating holes 233 of the guide tube 230a and, when pressure difference higher than a predetermined level is generated between the fluid intake passage 151 and the fluid exhaust passage 152, moves the piston 220 upward while overcoming the biasing force of the second spring 227 so that the piston 220 contacts the second seat portion 211b as shown in FIG. 8. Accordingly, in a state where the top opening of the invariable orifice 211 is closed by the ball 105a of the plunger 105, the bottom opening of the invariable orifice 211 comes to communicate with the variable orifice 221 of the piston 220.

Figures 9, 9A:
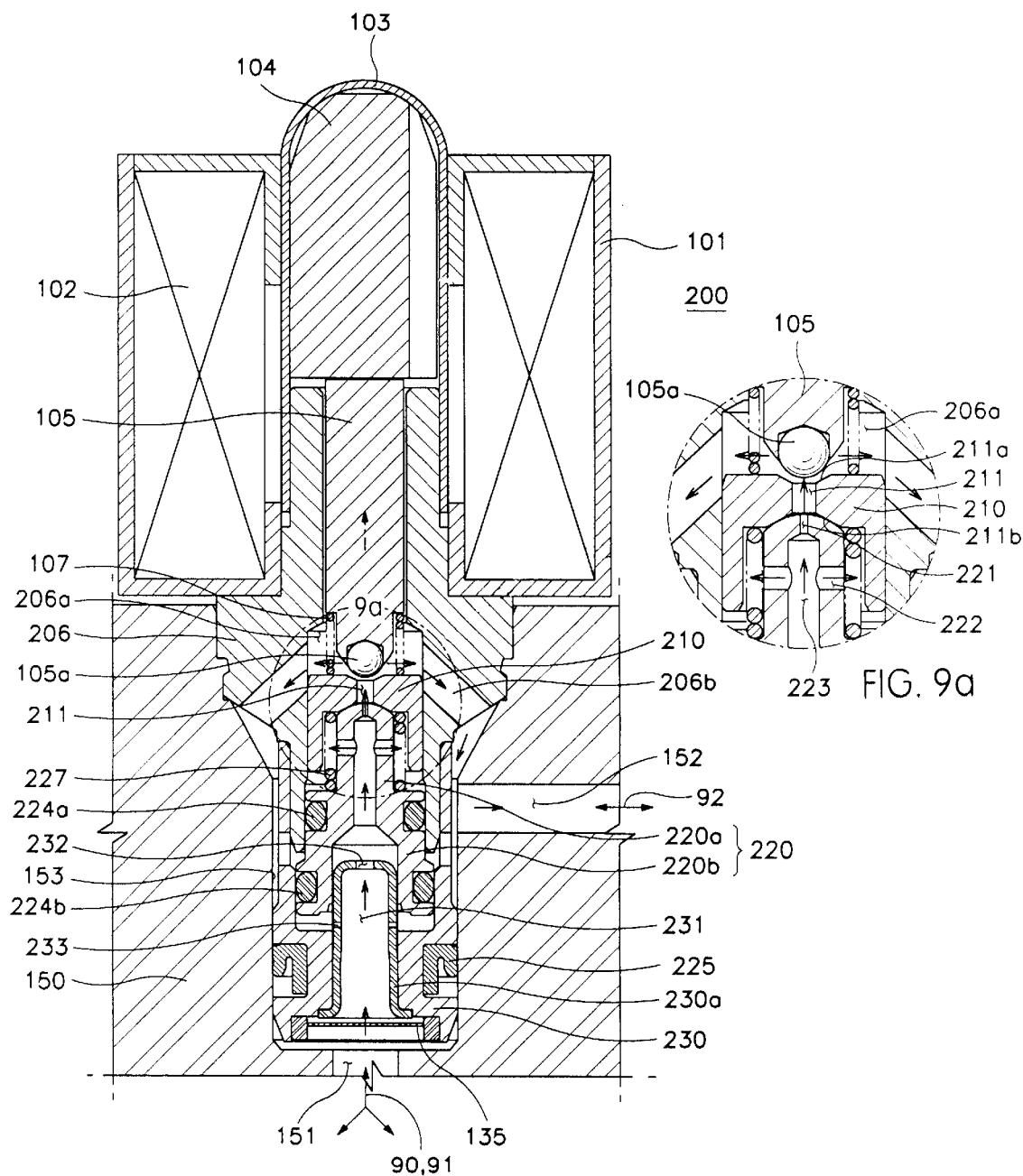
FIG. 9 is a sectional view of a solenoid valve for an anti-lock brake system according to a second embodiment of the present invention, showing an invariable orifice completely opened in a slip control mode.

In this state, when electric current applied to the solenoid valve 200 is disconnected for the pressure increasing operation, as shown in FIG. 9, the plunger 105 is moved upward by the biasing force of the first spring 107, thereby opening the top opening of the invariable orifice 211. As the top opening of the invariable orifice 211 is opened, the fluid within the variable orifice 221 is supplied to the wheel cylinder 92 through the invariable orifice 211 and the fluid outlet hole 206b, thereby increasing the brake pressure. At this point, although pressure difference occurs between the top and bottom openings of the invariable orifice 211, since the diameter of the variable orifice 221 is relatively small, the pressure can be stably supplied.

When the pressure difference between the top and bottom openings of the invariable orifice 211 is extinguished as the hydraulic pressure is supplied, the piston 220 is displaced downward by the biasing force of the second spring 227 to move away from the second seat portion 211b of the valve seat 210. As a result, the brake pressure is supplied to the invariable orifice 211 through both the variable orifice 221 and the branch passages 222.

As described, when the brake pressure is increased in the slip mode, since the brake pressure is stably supplied through the variable orifice 221 and the invariable orifice 211, pressure impact and noise occurring between the top and bottom openings of the invariable orifice 211 can be greatly reduced, and the brake operation can be effectively realized.

Figures 10, 10A:
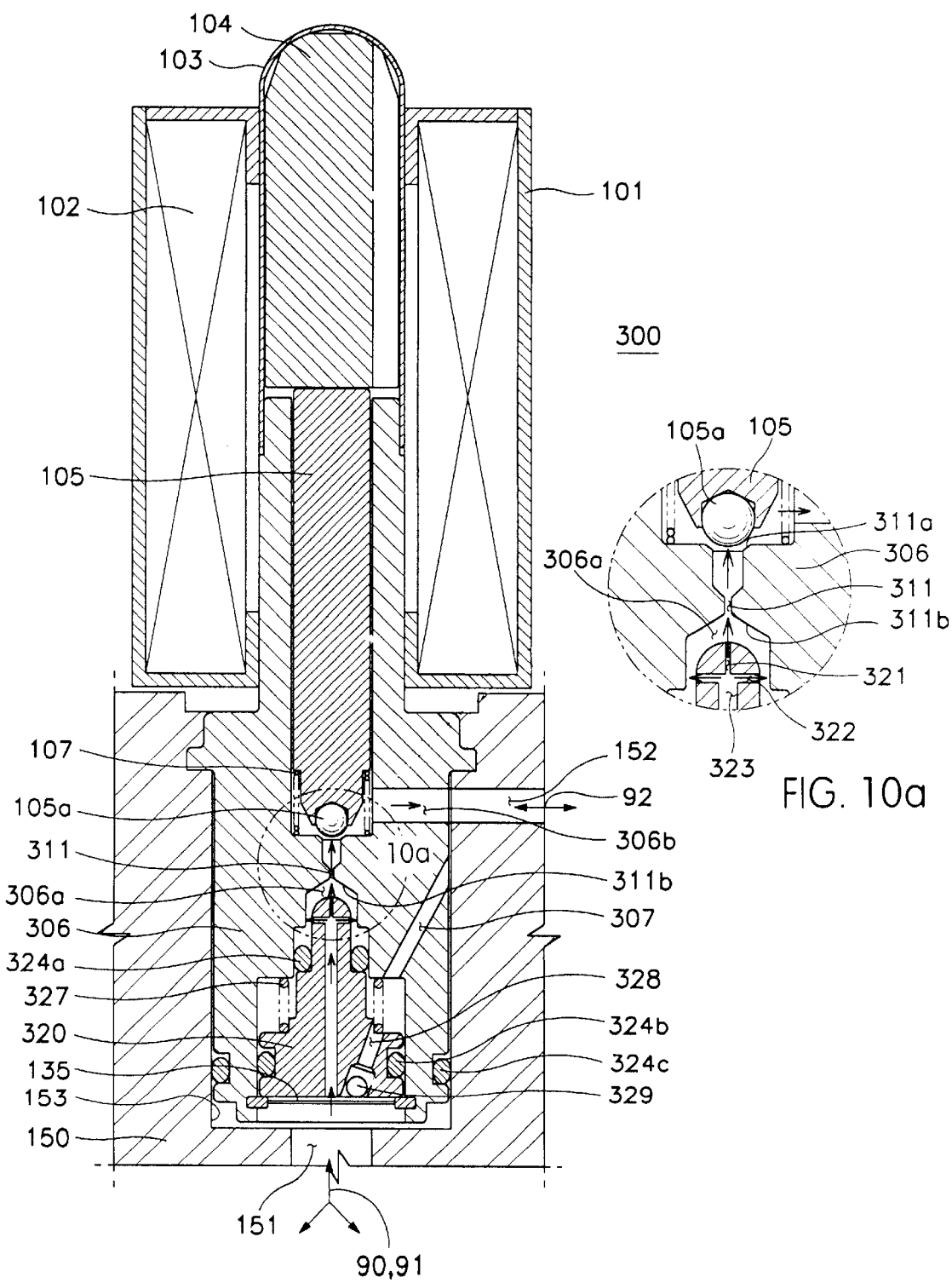
FIG. 10 is a sectional view of a solenoid valve for an anti-lock brake system according to a third embodiment of the present invention, showing an invariable orifice completely opened in a normal brake mode.

FIG. 10 shows a sectional view of a normal-open solenoid valve according to a third embodiment of the present invention. A description of parts which are identical to those in the first embodiment and have the same reference numbers will be omitted herein.

As shown in FIG. 10, a normal-open solenoid valve 300 of a third embodiment comprises a piston 320 disposed in a magnetic core 306 having an invariable orifice 311. The piston 320 is provided with a variable orifice 321 facing the invariable orifice 311 of the magnetic core 306 and is slidable such that the variable orifice 321 can contact or move away from the invariable orifice 311 of the magnetic core 306. Disposed between the magnetic core 306 and the plunger 105 is a first spring 107 for biasing the plunger 105 upward so as to maintain the invariable orifice 311 in an opened state during a normal brake operation, and disposed between the piston 320 and the magnetic core 306 is a second spring 327 for biasing the piston 320 downward so as to maintain the piston 320 in a position away from the invariable orifice 311 during the normal brake operation.

The magnetic core 306 is forcedly fitted in a bore 153 formed in a modulator block 150. The magnetic core 306 is provided with a piston receiving space 306a in which the piston 320 is slidably disposed, and a fluid outlet hole 306b for directing fluid supplied through the invariable orifice 311 to the fluid outlet passage 152.

First and second seat portions 311a and 311b for the respective ball 105a of plunger 105 and upper end of piston 320 are respectively formed on the top and bottom openings of the invariable orifice 311.

First and second O-rings 324a and 324b are provided around the piston 320 to prevent fluid from leaking through a gap between the magnetic core 306 and the piston 320, and a third O-ring 324c is provided around the magnetic core 306 to prevent fluid from leaking through a gap between the magnetic core 306 and the bore 153.

The piston 320 is provided with a piston passage 323 formed through a central axis and communicating the fluid intake passage 151 with the invariable orifice 311, and a plurality of branch passages 322 perpendicularly branched off from the piston passage 323 to communicate the piston passage 323 with the piston receiving space 306a, and a variable orifice 321 coaxially extending from the piston passage 323 to communicate the piston passage 323 with the piston receiving space 306a. The diameter of the variable orifice 321 is smaller than that of the invariable orifice 311.

A bypass passage 307 communicating with the fluid exhaust passage 152 is formed through the magnetic core 306, and a return passage 328 for communicating the bypass passage 307 with the fluid intake passage 151 is formed through the piston 320. A check valve 329 is installed within the return passage 328.

A filter 135 is provided on a bottom of the piston 320 to hold back solid substances in fluid.

The operation of the above-described normal-open solenoid valve will be described more in detail with reference to FIGS. 10 to 13.

In a normal brake mode, as shown in FIG. 10, the brake pressure formed by the master cylinder 90 passes through the fluid intake passage 151, the piston passage, branch passages, and variable orifice 323, 322 and 321 of the piston 320, the invariable orifice 311, the fluid outlet hole 306b, and the fluid exhaust passage 152 in this order, then is directed to the wheel cylinder 92 to realize the normal brake operation. When the braking operation is completed, the brake pressure within the wheel cylinder 92 is returned to the master cylinder 90 through the bypass passage 307 and the return passage 328.

Figures 11, 11A:
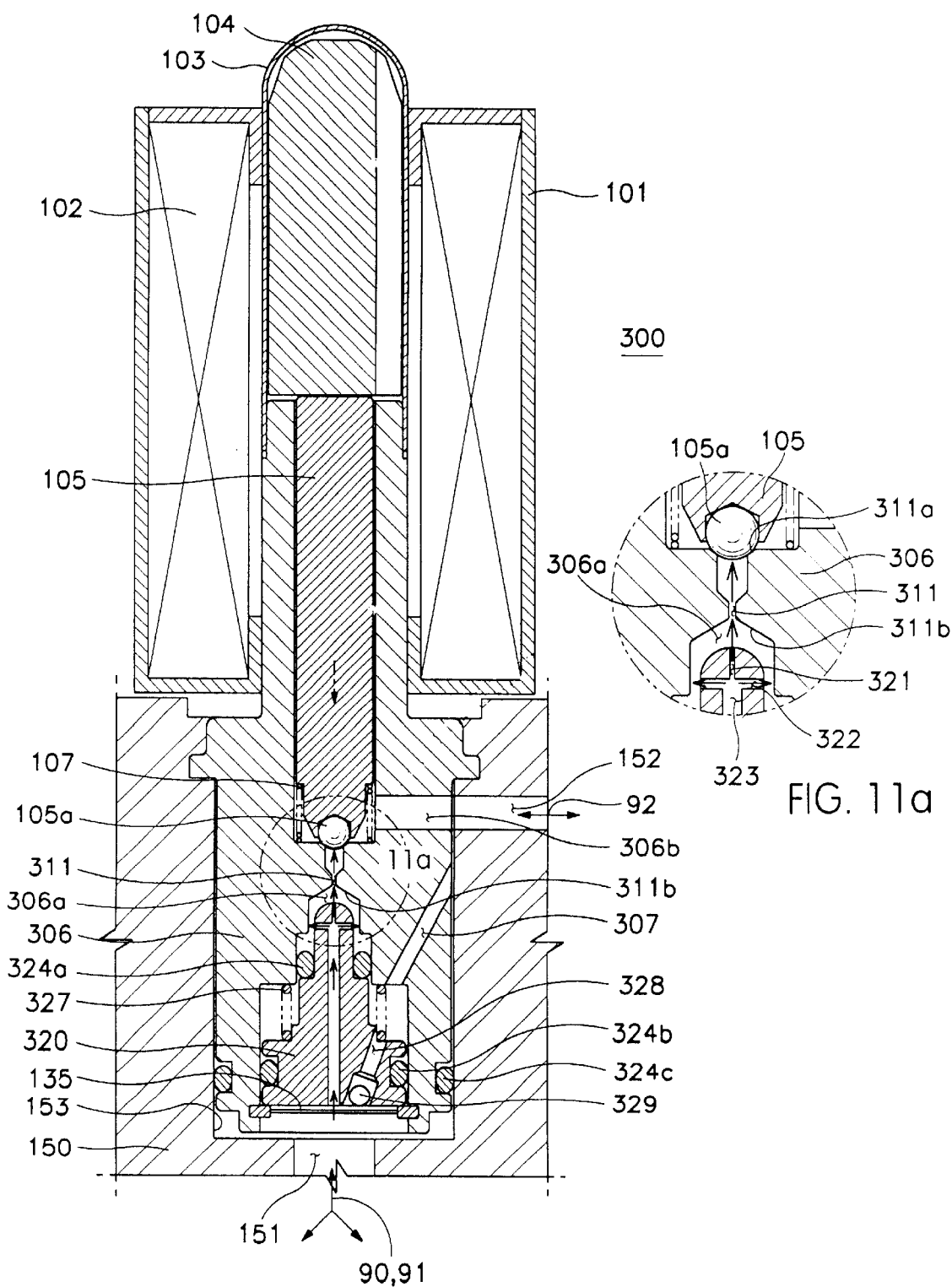
FIG. 11 is a sectional view of a solenoid valve for an anti-lock brake system according to a third embodiment of the present invention, showing an invariable orifice completely closed in a slip control mode.

In addition, in the pressure reducing or maintaining operation when a slip occurs on a wheel, electric current is applied to the solenoid valve 300, as shown in FIG. 11, and then, the plunger 105 is displaced downward while overcoming the biasing force of the first spring 107 such that the ball 105a is seated on the first seat portion 311a, thereby completely closing the invariable orifice 311. As a result, the brake pressure is not supplied to the wheel cylinder 92 any more.

Figures 12, 12A:
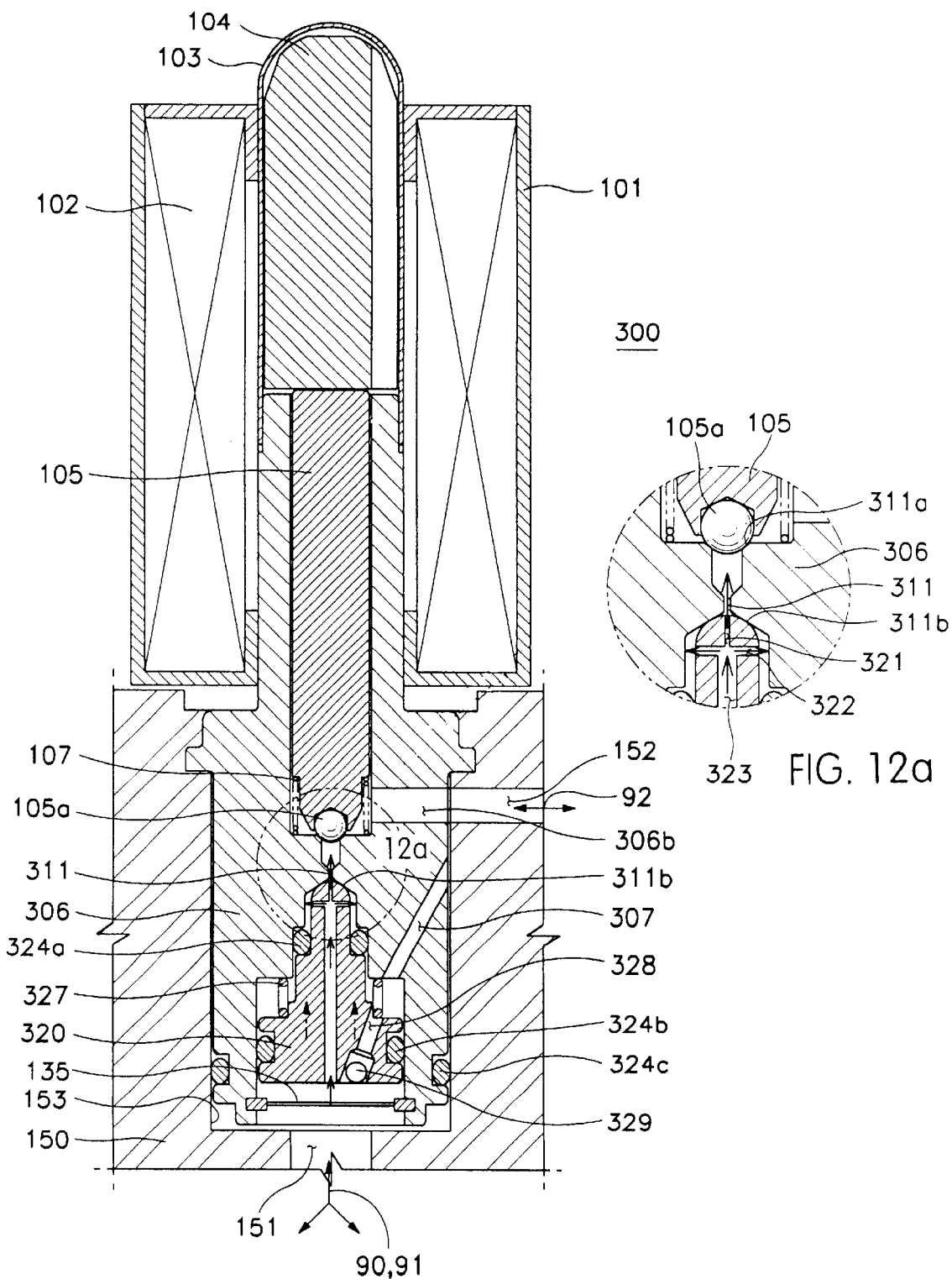
FIG. 12 is a sectional view of a solenoid valve for an anti-lock brake system according to a third embodiment of the present invention, showing a piston contacting an invariable orifice in a slip control mode.

At this point, since the brake pressure is continuously supplied to the solenoid valve 300 through the fluid intake passage 151, pressure within the solenoid valve 300 is steeply increased. The increased brake pressure acts on a lower end of the piston 320 and, when pressure difference higher than a predetermined level is generated between the fluid intake passage 151 and the fluid exhaust passage 152, moves the piston 320 upward while overcoming the biasing force of the second spring 327 so that the piston 320 contacts the second seat portion 311b as shown in FIG. 12. Accordingly, in a state where the top opening of the invariable orifice 311 is closed by the ball 105a of the plunger 105, the bottom opening of the invariable orifice 311 comes to communicate with the variable orifice 321 of the piston 320.

Figures 13, 13A:
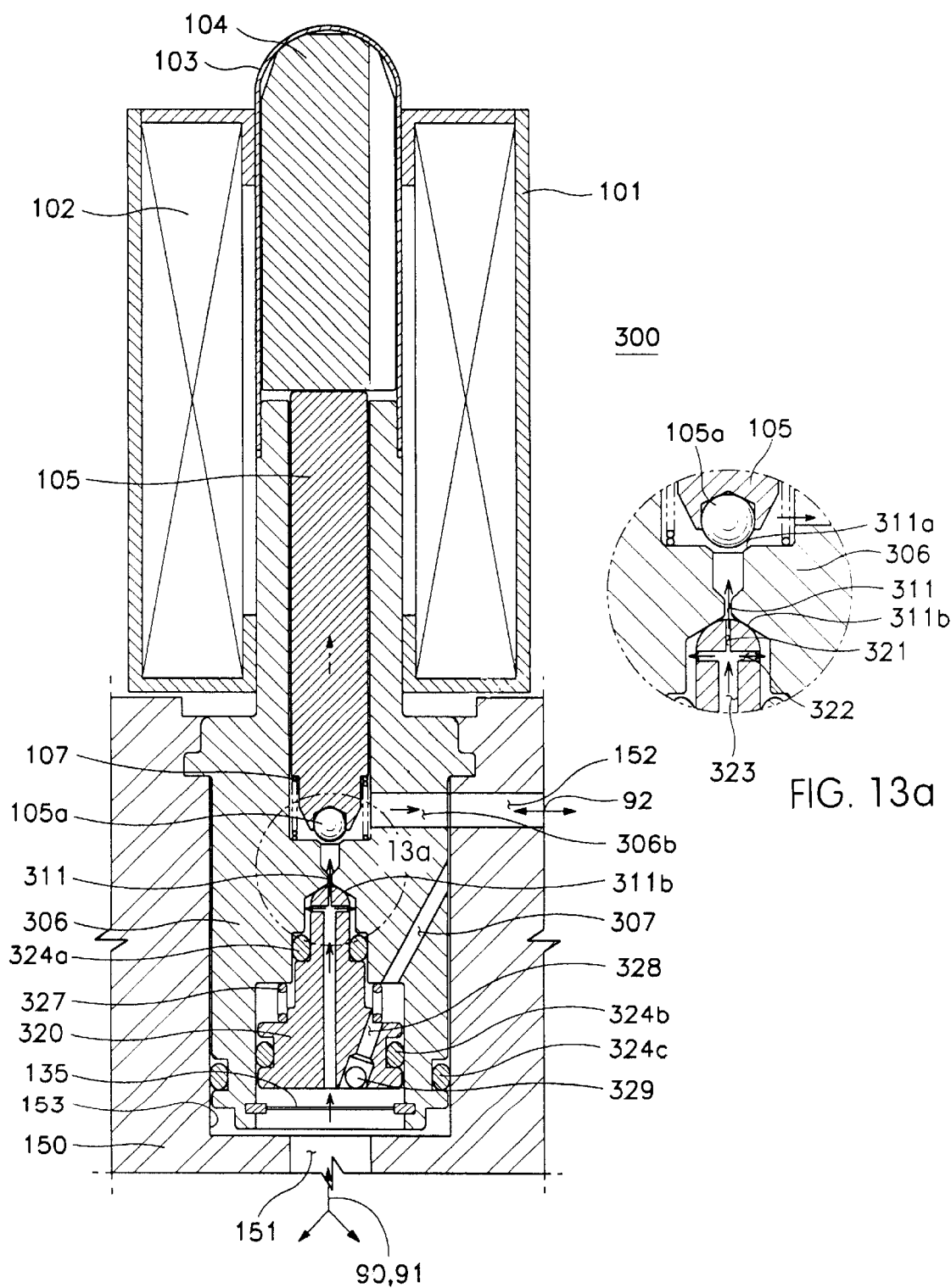
FIG. 13 is a sectional view of a solenoid valve for an anti-lock brake system according to a third embodiment of the present invention, showing an invariable orifice completely opened in a slip control mode.

In this state, when electric current applied to the solenoid valve 300 is disconnected for the pressure increasing operation, as shown in FIG. 13, the plunger 105 is moved upward by the biasing force of the first spring 107, thereby opening the top opening of the invariable orifice 311. As the top opening of the invariable orifice 311 is opened, the fluid within the variable orifice 321 is supplied to the wheel cylinder 92 through the invariable orifice 311 and the fluid outlet hole 306b, thereby increasing the brake pressure. At this point, although pressure difference occurs between the top and bottom openings of the invariable orifice 311, since the diameter of the variable orifice 321 is relatively small, the pressure can be stably supplied.

When the pressure difference between the top and bottom openings of the invariable orifice 311 is extinguished as the hydraulic pressure is supplied, the piston 320 is displaced downward by the biasing force of the second spring 327 to move away from the second seat portion 311b. As a result, the brake pressure is effectively supplied to the invariable orifice 311 through both the variable orifice 321 and the branch passages 322.

As described, when the brake pressure is increased in the slip mode, since the brake pressure is stably supplied through the variable orifice 321 and the invariable orifice 311, pressure impact and noise occurring between the top and bottom openings of the invariable orifice 311 can be greatly reduced, and the brake operation can be effectively realized.

Figure 14A:
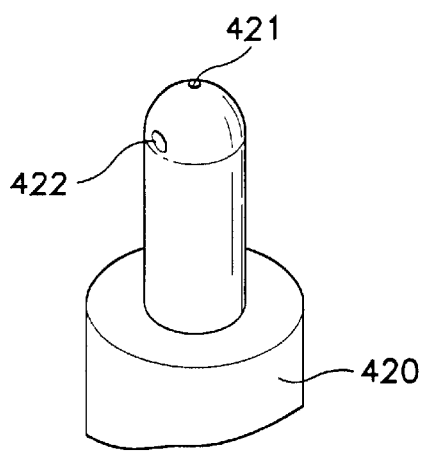
FIG. 14a is a perspective view illustrating a piston according to a modified example of the present invention.
Figure 14B:
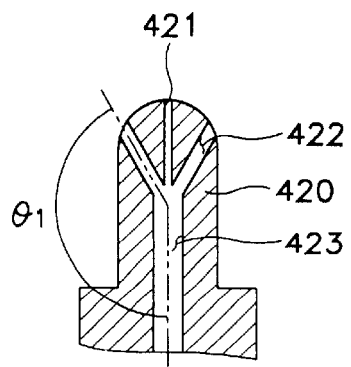

FIGS. 14a and 14b show a modified example of a piston used in a solenoid valve according to the present invention.

As shown in the drawings, a piston 420 is provided with a piston passage 423 formed along a central axis from a bottom to a certain level, a plurality of branch passages 422 branched off from an upper end of the piston passage 423 at a predetermined angle θ1, and a variable orifice 421 coaxially extending from the upper end of the piston passage 423 to a top of the piston 420. The diameter of the variable orifice 421 is smaller than that of the invariable orifice(See FIGS. 2 to 13).

Preferably, the predetermined angle θ1 is in a range of about 90–150 degrees.

Figure 15A:
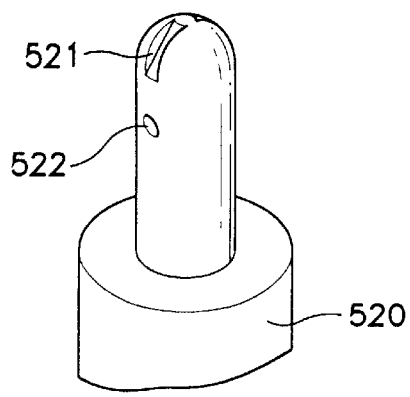
FIG. 15a is a perspective view illustrating a piston according to another modified example of the present invention.
Figure 15B:
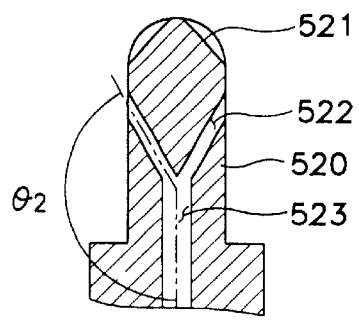

FIGS. 15a and 15b show another modified example of a piston used in a solenoid valve according to the present invention.

As shown in the drawings, a piston 520 is provided with a piston passage 523 formed along a central axis from a bottom to a certain level, a plurality of branch passages 522 branched off from an upper end of the piston passage 523 at a predetermined angle θ2, and a plurality of fluid grooves 521 formed on a top of the piston 520. Each width of the fluid grooves 521 is smaller than the diameter of the invariable orifice so that the fluid groove 521 can function as the variable orifice(See FIGS. 2 to 14). That is, in a slip control mode, fluid supplied through the branch passages 522 of the piston 520 is directed to the invariable orifice through the fluid grooves 521.

Preferably, the predetermined angle θ2 is in a range of about 90–150 degrees.

As described above, since the normal-open solenoid valve of the present invention includes the variable orifice that can reduce the brake pressure along with the invariable orifice in the slip control mode, the brake force can be easily regulated and the slip can be exactly controlled. This dual orifice structure prevents abrupt pressure variation in the oil passage so that water hammering problem does not occur. Accordingly, the present invention can reduce the pressure impact and noise.

In addition, the normal-open solenoid valve of this invention has the magnetic core in which the invariable orifice, the piston having the variable orifice, and the oil passages are provided, thereby simplifying the structure and facilitating the manufacture.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A solenoid valve for an anti-lock brake system comprising a wheel cylinder, a master cylinder for supplying brake pressure to the wheel cylinder, a modulator having a fluid intake passage communicating with the master cylinder and a fluid exhaust passage communicating with the wheel cylinder, and a solenoid valve mounted within the modulator to control hydraulic pressure supplied from the master cylinder to the wheel cylinder, the solenoid valve comprising:

a coil assembly disposed within a yoke to create an electromagnetic field using electric current applied;

an armature disposed through a central axis of the yoke, the armature being slidable along the central axis by the electromagnetic field;

a plunger coupled to the armature;

a magnetic core provided with a first orifice opened and closed by the plunger to selectively communicate the fluid intake passage with the fluid exhaust passage, one end of the magnetic core being forcedly fitted in a bore of the modulator block; and a piston slidably disposed under the magnetic core to contact or move away from the first orifice formed in the magnetic core according to a brake mode, the piston being provided with a second orifice which comes into direct fluid communication with the first orifice when the piston contacts the first orifice, a diameter of the second orifice in the piston being smaller than that of the first orifice, wherein the piston contacts the first orifice in a slip control mode, thus only fluid passing the second orifice in the piston is supplied to the wheel cylinder after passing through the first orifice and the fluid exhaust passage, and wherein the second orifice is defined by a plurality of fluid grooves formed on a top of the piston, each width of the grooves is smaller than the diameter of the first orifice, and the piston is provided with a piston passage formed through a central axis and communicating the fluid intake passage with the second orifice, and a plurality of branch passages branched off from the piston passage at a predetermined angle such that fluid supplied through the fluid intake passage can be directed to the first orifice in a normal brake mode.

2. A solenoid valve of claim 1 wherein the predetermined angle is in a range of about 90–150 degrees.

3. A solenoid valve for an anti-lock brake system comprising a wheel cylinder, a master cylinder for supplying brake pressure to the wheel cylinder, a modulator having a fluid intake passage communicating with the master cylinder and a fluid exhaust passage communicating with the wheel cylinder, and a solenoid valve mounted within the modulator to control hydraulic pressure supplied from the master cylinder to the wheel cylinder, the solenoid valve comprising:

a coil assembly disposed within a yoke to create an electromagnetic field using electric current applied;

an armature disposed through a central axis of the yoke, the armature being slidable along the central axis by the electromagnetic field;

a plunger coupled to the armature;

a magnetic core provided with a first orifice opened and closed by the plunger to selectively communicate the fluid intake passage with the fluid exhaust passage, one end of the magnetic core being forcedly fitted in a bore of the modulator block; and a piston slidably disposed under the magnetic core to contact or move away from the first orifice formed in the magnetic core according to a brake mode, the piston being provided with a second orifice which comes into direct fluid communication with the first orifice when the piston contacts the first orifice, a diameter of the second orifice in the piston being smaller than that of the first orifice, wherein the piston contacts the first orifice in a slip control mode, thus only fluid passing, the second orifice in the piston is supplied to the wheel cylinder after passing through the first orifice and the fluid exhaust passage, wherein the piston is further provided with a piston passage coaxially extending from the second orifice to communicate the fluid intake passage with the second orifice, and a plurality of branch passages branching off from the piston passage at a predetermined angle such that fluid supplied through the fluid intake passage can be directed to the first orifice in a normal brake mode.

4. A solenoid valve of claim 3 wherein the predetermined angle is in a range of about 90–150 degrees.

5. A solenoid valve of claim 3 wherein at least one O-ring is provided around an outer circumference of the piston.

6. A solenoid valve of claim 5 wherein a spring is disposed between the magnetic core and the piston, the spring biasing the piston in a direction away from the first orifice of the magnetic core in a normal brake mode.

7. A solenoid valve of claim 6 wherein the magnetic core is provided with a fluid outlet hole for directing fluid supplied through the first orifice to the fluid exhaust passage.

8. A solenoid valve of claim 7 wherein a lip-seal is provided between an outer circumference of the magnetic core and the bore of the modulator block.

9. A solenoid valve for an anti-lock brake system comprising a wheel cylinder, a master cylinder for supplying brake pressure to the wheel cylinder, a modulator having a fluid intake passage communicating with the master cylinder and a fluid exhaust passage communicating with the wheel cylinder, and a solenoid valve mounted within the modulator to control hydraulic pressure supplied from the master cylinder to the wheel cylinder, the solenoid valve comprising:

a coil assembly disposed within a yoke to create an electromagnetic field using electric current applied;

an armature disposed through a central axis of the yoke, the armature being slidable along the central axis by the electromagnetic field;

a plunger coupled to the armature;

a magnetic core provided with a first orifice opened and closed by the plunger to selectively communicate the fluid intake passage with the fluid exhaust passage, one end of the magnetic core being forcedly fitted in a bore of the modulator block; and a piston slidably disposed under the magnetic core to contact or move away from the first orifice formed in the magnetic core according to a brake mode, the piston being provided with a second orifice which comes into direct fluid communication with the first orifice when the piston contacts the first orifice, a diameter of the second orifice in the piston being smaller than that of the first orifice, wherein the piston contacts the first orifice in a slip control mode, thus only fluid passing the second orifice in the piston is supplied to the wheel cylinder after passing through the first orifice and the fluid exhaust passage.

10. A solenoid valve of claim 9 wherein the magnetic core is provided with a valve seat in which the first orifice is formed.

11. A solenoid valve of claim 9 further comprising a fluid guide member fixedly fitted in the bore under the piston, the fluid guide member functioning as a means of guiding fluid supplied from the master cylinder to the piston as well as functioning as a stopper for restricting the downward movement of the piston.

12. A solenoid valve of claim 11 wherein a lip-seal is formed between an outer circumference of the fluid guide member and the bore of the modulator block.

13. A solenoid valve of claim 11 wherein a guide tube is formed in the fluid guide member to define a guide passage communicating with the fluid intake passage, a portion of the guide tube extending into the piston.

14. A solenoid valve of claim 13 wherein the guide tube is provided at a top with a first communicating hole for communicating the guide passage with the second orifice, and at a side with a plurality of second communicating holes for applying fluid to a lower end of the piston in a slip control mode.

15. A solenoid valve of claim 1 wherein the magnetic core is provided with a bypass passage communicating with the fluid exhaust passage, the piston is provided with a return passage for communicating the bypass passage with the fluid intake passage, and a check valve is installed within the return passage.

16. A solenoid valve of claim 9 further comprising a filter for holding back solid substances in fluid to be supplied.

* * * * *